FEEDING AND PULLING DEVICES OF MAGNETIC THIN FILM COATED WIRES IN POWER LOOM FOR WEAVING MAGNETIC MEMORY ELEMENTS

Filed June 8, 1965 3 Sheets-Sheet 1

INVENTORS
Akira Matsushita
BY Chikara Uchida
H. Edward Mestern

INVENTORS
Akira Matsushita
BY Chikara Uchida
H. Edward Mestern

INVENTORS
Akira Matsushita
Chikara Uchida
BY
H. Edward Mesteen

United States Patent Office 3,323,557

Patented June 6, 1967

3,323,557

FEEDING AND PULLING DEVICES OF MAGNETIC THIN FILM COATED WIRES IN POWER LOOM FOR WEAVING MAGNETIC MEMORY ELEMENTS

Akira Matsushita and Chikara Uchida, both of Tokyo-to, Japan, assignors to Toko Kabushiki Kaisha, Ota-ku, Tokyo-to, Japan, a joint-stock company of Japan Filed June 8, 1965, Ser. No. 462,265
Claims priority, application Japan, June 9, 1964, 39/32,516; June 10, 1964 (utility model), 39/45,710
2 Claims. (Cl. 139—128)

This invention relates to a device for feeding wires coated with magnetic thin film as weft into conductor wires as warp in a power loom for weaving magnetic memory elements as well as a device for drawing the wefts into their right positions in the warps.

It is an object of the present invention to provide a feeding device which is disposed at one side of and in parallel with the warp conductor wires and which supplies one by one the required number of magnetic thin film coated wires to a pulling shaft which extends from the opposite side of the power loom through the warp conductor wires and reaches an extreme end portion of a weft magnetic wire.

It is another object of the present invention to provide a pulling device which is disposed at the opposite side of the abovementioned feeding device and introduces the magnetic thin film coated wires into the correct weft positions.

The nature, principle, and details of the invention will be more apparent from the following detailed description taken in connection with the accompanying drawing in which like parts are designated by like reference numerals and characters, and in which.

For proper understanding of the present invention, an outline of the power loom for weaving magnetic memory elements will be explained first.

Figure 1:
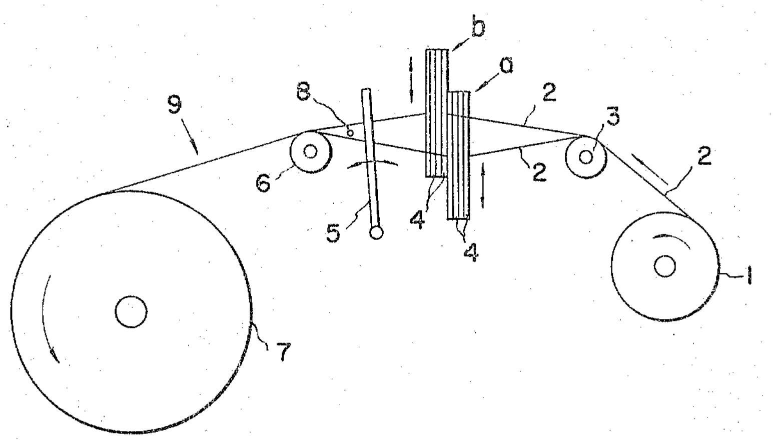
FIG. 1 is a side view showing the schematic construction of the entire power loom.

Referring to FIG. 1, the principal components of the power loom consist of a pay-off drum 1 (or warp beam drum) which stores lengths of warp conductor wires 2 (in some cases, spacer wires are interposed between each of the conductor wires), a guide roller 3, a plurality of heald frames 4, a reed 5, another guide roller 8, and a winding drum 1 (or cloth beam drum) which winds up the finished product of the woven wire memory element. The warp conductor wires 2 issuing from the pay-off drum are caused to pass through a suitable number of heald frames 4 and the reed 5 through the guide roller 3 and are finally wound up on the winding drum by way of the guide roller 6. In the case of a plain weave, the heald frames divided into two groups *a* and *b*, as illustrated, are made to move up and down alternately, whereby a batch of warp conductor wires passing through the frame *a* and another batch of warp conductor wires passing through the frame *b* are opened up and down alternately between the guide rollers 3 and 6 so as to introduce the weft magnetic thin film coated wire into the warp conductor wire at a position between the reed 5 and the guide roller 6 at every time the said batches of the warp conductor wires open up and down and then the weft magnetic wire thus introduced into the wrap is beaten sufficiently by oscillating motion of the reed 5. The woven magnetic memory element 9 thus fabricated is then taken up on the winding drum (or cloth beam drum) 7.

The said weft magnetic wires 8 for the magnetic memory element 9 to be woven have a thicker diameter than that of the warp conductor wires and are previously cut into a required length and arrayed at a constant interval on an arraying plate 11 of the feeding device for the magnetic thin film coated wires which is provided at one side of the lower loom and supplies one by one the required number of magnetic thin film coated wires to the pulling shaft 17 which extends from the opposite side of the power loom through the warp conductor wires up to the tip end of the magnetic wire. Then, by the intermittent sliding motion of the conveying head $11_a$ on the surface of its bed 12, the weft magnetic wires are brought to the pull-in position one after another.

Figure 2:
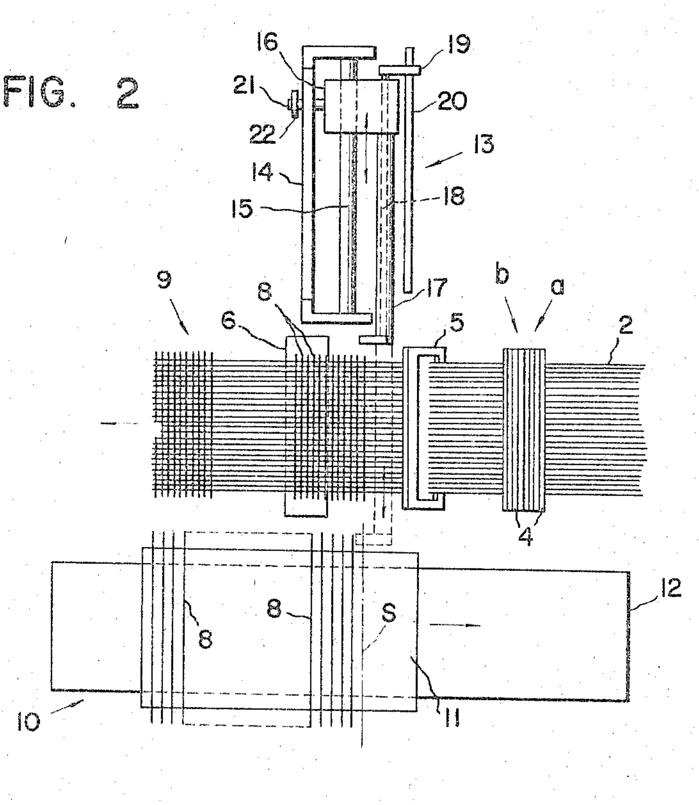
FIG. 2 is a plan view showing both feeding and pulling devices of magnetic thin film coated wires and a main part of the power loom.

The feeding device of magnetic thin film coated wires as shown in FIG. 2 comprises a bed 12 disposed in parallel with the extending direction of the warp conductor wires, a conveying head $11_a$ connected to a conveying mechanism and an arraying plate 11 which is mountable on and dismountable from the said conveying head $11_a$. The magnetic wires arrayed on the surface of said arraying plate 11 at a constant interval are transferred one after the other to the pull-in position indicated with the chain line S so that all of them may be furnished to the pulling shaft 17. When a required number of magnetic wires has been fed, the conveying head $11_a$ can be restored manually to its original position by simply operating the handle of the conveying mechanism.

The details of the present invention will now be described with respect to a preferred embodiment as illustrated in FIGS. 2, 3, 4, 5, 6 and 7 which show essential parts of the feeding and pulling devices of the power loom.

Referring to FIG. 2, the pulling device 13 is disposed on the opposite side of the feeding device 10 for the magnetic wires and the said device comprises a rectangular frame 14, one long side of which is open, a guide shaft 15 fitted in across the short sides of the frame, a sliding block 16 which is slidably supported on the said guide shaft 15 and reciprocates in a direction perpendicular to the extending direction of the warp conductor wires 2, and a pulling shaft 17 secured on its one end to the said sliding block 16 at the open side of the frame and in parallel with the said guide shaft 15. When the sliding block 16 performs reciprocating motions, the said pulling shaft 17 is made to project up to the pull-in position of the magnetic wire arranged on the arraying plate 11 of the feeding device on the opposite side, the said position being indicated by the dotted line in FIG. 2.

Figure 3:
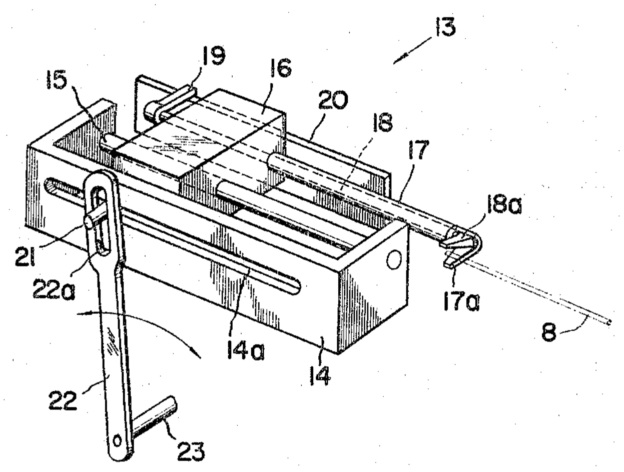
FIG. 3 is a perspective view of the pulling device.

In FIG. 3, the pulling shaft 17 contains inside thereof along its axial direction of a clamping shaft 18, and, at one end portion of the said pulling shaft and the clamping shaft, there are provided clamping beaks $17_a$ and $18_a$, respectively, the former being integrated with the pulling shaft and non-movable and the latter being integrated with the clamping shaft and movable. This clamping shaft 18 also extends through the sliding block 16 and is freely rotatable. At the end of the clamping shaft 18 which passes through the sliding block 16, there is secured a contact piece 19, the end of which is press-contacted by the force of a spring (not shown) to the top edge of the plate 20 which moves up and down and is provided in parallel with the reciprocating direction of the clamping shaft 18. When the plate 20 moves upward, the clamping shaft 18 is caused to rotate by the contact piece 19 whereby a magnetic wire 8 positioned on the fixed clamping beak $17_a$ is clamped by closure of the movable clamping beak $18_a$. Since the plate 20 is in parallel with the direction of the reciprocating motion of the sliding block 16, the clamping beaks can be opened and closed whenever the plate 20 moves up and down regardless of whether or not the pulling shaft 17 is projected, is in reciprocating motion, or is in stoppage.

In the above example, a driving means which imparts reciprocating motion to the sliding block 16 is constructed as follows: a driving shaft 21 provided on one lateral surface of the sliding block 16 which is long enough to protrude beyond a guide slot $14_a$ formed on the long side of the frame 14, and this protruding end of the driving shaft 21 is engaged with a slot formed on a driving lever 22, whereby oscillating motion performed by the shaft 23 is converted to a linear motion. In any event, since the principal purpose is to obtain reciprocating motion of this pulling device in cooperation with the operation of the weaving mechanism, any other suitable means for assuring reciprocating motion such as use of hydraulic or air pressure or any known driving means may, of course, be adopted without departure from the scope of the present invention.

Figure 4:
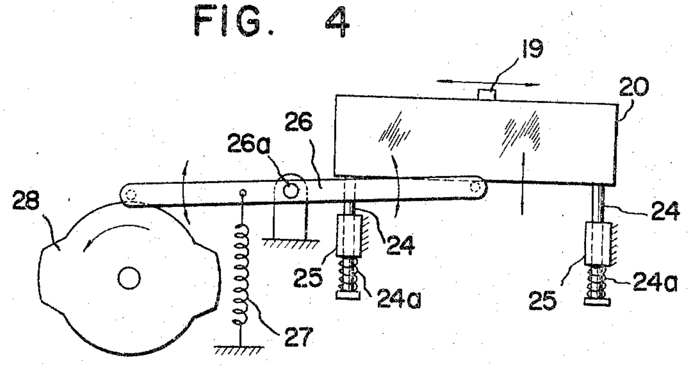
FIG. 4 is a side view showing a plate which moves up and down and a mechanism to cause such motion, all of which constitute a main part of the abovementioned pulling device.

FIG. 4 shows one example of means to cause up-and-down motion of the plate 20. This plate 20 is intended to open and close the clamping portion comprising the clamping beaks $17_a$ and $18_a$ of the pulling shaft 17 for required numbers of frequency. In order to secure such opening and closing frequency, there are fitted two shafts 24, 24 at the bottom edge of the plate 20 for vertical up-and-down motion of the plate 20, and supporting collars 25, 25 are further provided around the shafts 24, 24 in a slidable manner. The shafts 24 are further provided with springs $24_a$, $24_a$ which pull the shafts 24, 24 downward. Also, a cam lever 26 is provided for pushing the plate 20 upward in engagement with the bottom edge thereof. This cam lever 26 is supported on a pivot $26_a$ in the middle portion and connected with a spring 27 which is stronger than the said spring $24_a$ at a portion to the left side of the pivot $26_a$. By the force of this spring 27, the plate 20 is always kept ready to move upward. When the difference between the up-and-down stroke of the plate 20 and closure angle of the said clamping pawls is properly adjusted and a disc-shaped plate cam 28 which is press-contacted to the extreme left end of the cam lever 26 is caused to rotate, the said cam lever 26 carries out the required oscillating motion to move the plate up and down. It should be understood, of course, that this up-and-down motion of the plate 20 does not depend on the above-described mechanism alone, but any other proper methods such as, for example, attracting the left end portion of the cam lever 26 by an electromagnetic mechanism or directly moving the plate up and down by a known device is also applicable.

Having described so far the mechanism of the pulling device of the present invention, we are about to explain herein below the operations as to how the magnetic thin film coated wires 8 can be drawn into the warp conductor 2 by the pulling device of the present invention.

As described in the foregoing, when the warp conductor wires 2 are opened in upper and lower portions by means of the heald frames *a* and *b*, the plate 20 is first moved upward with the result that the clamping portion is closed by the closure action of the movable clamping beak $18_a$ through a medium of the contact piece 19 and the clamping shaft 18. At the same time, the sliding block 16 is caused to slide forward toward the opposite feeding device so as to project the pulling shaft 17 through the warp conductor wires 2 up to the edge of the sliding head 11 of the feeding device 10. When the clamping portion passes through the warp conductor, the plate 20 moves downward and the clamping portion is opened. When the clamping shaft 17 further porceeds and reaches the end portion of the magnetic wire 8 which has previously been brought to the pull-in position on the arraying plate 11 to place the said wire at the position between the fixed clamping beak $17_a$ and the movable clamping beak $18_a$, the pulling shaft 17 stops. As soon as the plate 20 moves upward to clamp the magnetic wire 8 by the clamping portion, the pulling shaft 17 begins to revert to its original position, at which time the magnetic wire 8 is drawn into the beating position in the warp conductor wires 2. When the pulling shaft 17 finishes its returning motion, the plate 20 moves downward to open the clamping portion and the weft magnetic wire 8 is beaten by the oscillating motion of the reed 5.

Upon completion of beating of the weft magnetic wire 8, the heald frames *a* and *b* exchange their positions. At this moment, there is also imparted a small amount of forwarding action to the warp conductor wires 2 so that the woven wire memory element may be rolled up onto the winding drum gradually. On the other hand, the feeding device 10 of magnetic wires causes the arraying plate 11 to move rightward so as to bring the subsequent magnetic wire 8 to its pull-in position. After a series of these operations of the mechanism has been accomplished completely, the pulling device repeats the afore-described operations.

Figures 5, 6, 7:
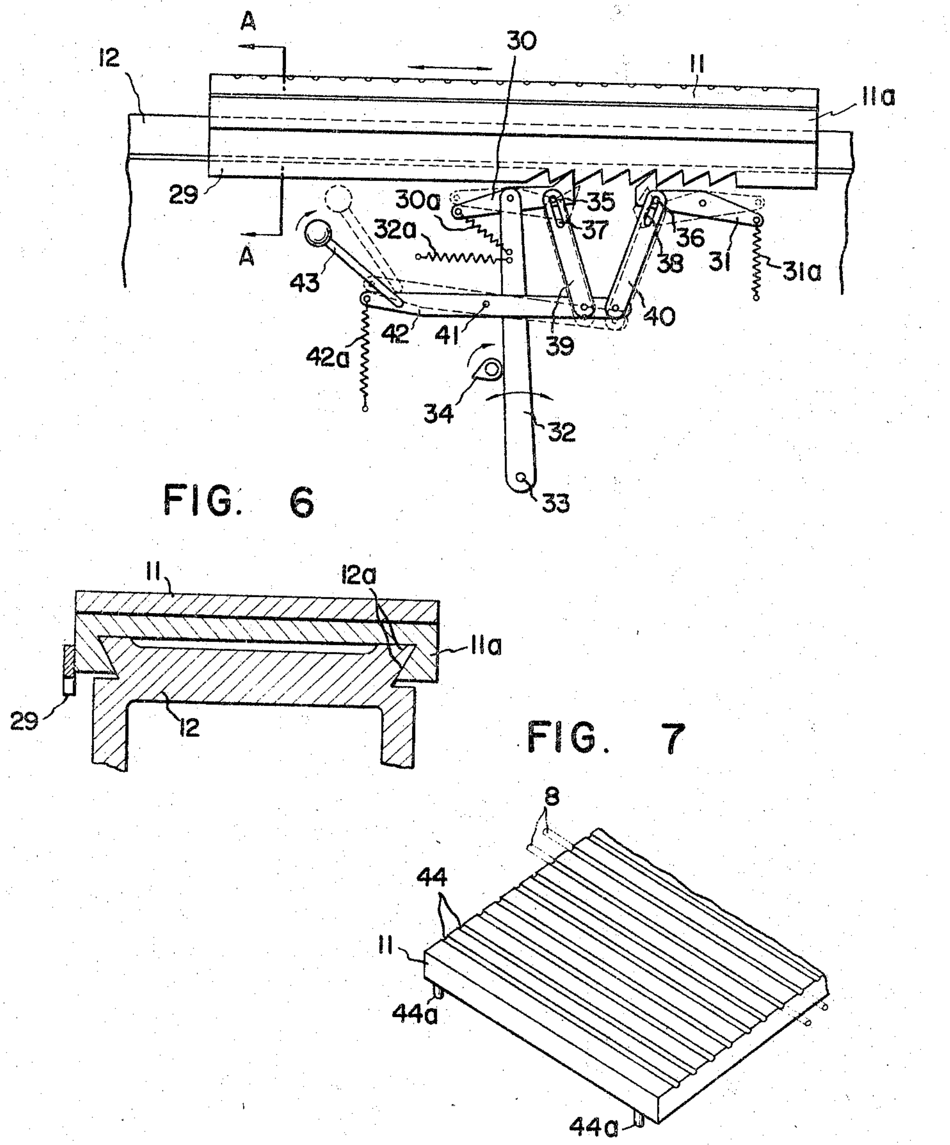
FIG. 5 is a side view of a feeding device of magnetic thin film coated wires.
FIG. 6 is a sectional front view of the feeding device taken along the line A—A in FIG. 5.
FIG. 7 is a perspective view showing a part of a plate for arraying weft magnetic wires.

Now, we come to explain the construction and operation of the magnetic wire feeding device in reference to FIGS. 5, 6 and 7. Referring to FIGS. 5 and 6, the basic structure of the feeding device comprises a bed 12, a conveying head $11_a$ which slides on the sliding surface $12_a$ of the bed 12, a rack 29 provided with a portion of a saw-tooth shape fixed on one lateral surface of the said conveying head $11_a$, pawls 30, 31 engaged with said saw-toothed portion of the rack 29, an oscillating lever 32 which pivotally fixes a part of this pawl 30, spring $30_a$ for press-contacting the said pawl 30 to the rack 29, and a spring $31_a$ for press-contacting the pawl 31 pivotally fixed on the bed 12 to the said rack 29.

The said oscillating lever 32 is intended to transfer the conveying head 13 intermittently toward the right side by way of the pawl 30 and the rack 29 by its oscillating motion on the pivot 33 at the bottom of the lever, the conveying position of which has been regulated by the pawl 31. In order to perform this operation, there is provided on the oscillating lever 32 a cam 34 and a spring $32_a$ which pulls the lever 32 to the left side.

Further, the forwarding pawl 30 and stopping pawl 31 are provided, at the opposite position of the respective springs $30_a$, $31_a$, with tension levers 39, 40 engaged with pins 35, 36 and slots 37, 38. Each of the said tension levers 39, 40 is pivotally fixed at the right end portion of a transverse lever 42. When the lever 42 is rotated in the clockwise direction about a pivotal shaft 41 by means of a handle 43 which is attached to the left end portion of the transverse lever 43, the tension levers 39 and 40 release the forwarding pawl 30 and the stopping pawl 31 from the rack 29 (as indicated by a dotted line) whereby the conveying head $11_a$ becomes free to move in both left and right directions. When the handle 43 is returned to its initial position, the transverse lever 42 returns to its original position by the force of the spring $42_a$ and the forwarding pawl 30 and the stopping pawl 31 are respectively engaged with the saw-toothed portion of the rack 29 by the force of the springs $30_a$, $31_a$. And, the conveying head $11_a$ carriers on its upper surface an arraying plate 11 which is mountable on and dismountable from the said conveying head. On the top surface of this arraying plate 11, there are formed at a constant interval a plurality of grooves 44 (for example, 30 grooves) for arraying the magnetic wires 8 as shown in FIG. 7. At the bottom surface of the said arraying plate 44, there are provided a plurality of small projections $44_a$ so as to fit the arraying plate 11 on the fixed position of the conveying head $11_a$ by simply inserting the small projections into the corresponding small holes formed on the conveying head $11_a$. It is a matter of course that various other methods can be adopted for fitting the arraying plate to the conveying head.

In weaving the magnetic memory element, a plurality of magnetic thin film coated wires 8 are arranged beforehand on the arraying plate 11, the magnetic wire of the extreme right end being aligned with the pull-in position S. Thereafter, when the feeding device 10 is put into operation, the pulling shaft 17 catches this magnetic wire 8 by the clamping portion and draws the said magnetic wire into its weft position at every time the warp conductor wires 2 are alternately opened in upper and lower portions; on the other hand, the conveying head $11_a$ is simultaneously transferred rightward, thus continuous beating of the weft magnetic wire can be carried out.

In this way, when weaving of a unit of the magnetic memory element 9 is completed after a required number of weft magnetic wires 8 have been beaten in the warp conductor wire, the operation of the feeding device is stopped by the action of an automatic stoppage device. Thereupon, the returning handle 43 for returning the conveying mechanism is rotated to the direction of the arrow mark to restore the conveying head $11_a$ to its initial position. The foregoing operations of the feeding device can be repeated by replenishing the magnetic wires 8 on the empty grooves on the arraying plate 44. Needless to say, a certain space must be provided between the preceding unit of the woven memory element and any subsequent unit of the magnetic memory element to be woven.

As described heretofore, the present invention has many excellent advantages such that a required number of magnetic thin film coated wires are arrayed in advance on the grooves formed on the arraying plate with the consequence that number of beating of the weft magnetic wire is always constant and the resulting woven magnetic memory elements are uniform, that, by manually rotating the handle 43, the forwarding and stopping pawls 30 and 31 are released from the saw-toothed portion of the rack 29 and the conveying head $11_a$ can be easily pushed back by hand to its original position, and that since the pulling shaft 17 projects through the warp up to the pull-in position of the magnetic wire with its clamping portion closed, this projection of the pulling shaft does in no way contact the upper and lower warp conductor wires to damage them.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. A device for feeding and pulling magnetic thin film coated weft wires into warp conductor wires in a power loom for weaving magnetic memory elements which comprises in combination: a sliding block which reciprocates in a direction perpendicular to the extending direction of said warp conductor wires; a pulling shaft provided at a portion on the said sliding block; a clamping portion constructed with a clamping shaft accommodated inside the said pulling shaft, a fixed clamping piece formed at one extreme end portion of the pulling shaft and a movable clamping piece provided at one extreme end of the said clamping shaft at a position corresponding to the said fixed clamping piece; a plate which is disposed in parallel with the reciprocating direction of said sliding block and moves up and down to effect clamping operation by the said clamping portion; and a contact piece provided at other end portion of the said clamping shaft and press-contacting onto the top edge of the said plate.

2. A device for feeding and pulling magnetic thin film coated weft wires into warp conductor wires in a power loom for weaving magnetic memory element which comprises in combination: a bed disposed in parallel with the direction of warp conductor wires: a conveying head which slides on the surface of the said bed; a rack with saw-toothed portion in one part thereof; a forwarding pawl engaged with the said saw-toothed portion of the rack and transferring the said rack for every one pitch; a stopping pawl to regulate the transfer position of the said rack; a tension lever to release the said forwarding pawl from the saw-toothed portion of the said rack; another tension lever to release the said stopping pawl from the saw-toothed portion of the rack; a transverse lever for pivotally fixing said two tension levers thereon; a handle for rotating the said transverse lever; an arraying plate mountable on and dismountable from the said conveying head and provided on one surface thereof with a plurality of grooves at a constant interval for arraying said weft wires.

References Cited

UNITED STATES PATENTS

| | | | |
|---|---|---|---|
| 153,417 | 7/1874 | Baldwin | 139—130 |
| 877,904 | 2/1908 | Carpenter | 139—128 X |
| 929,346 | 7/1909 | Tilp | 139—130 |
| 1,812,506 | 6/1931 | Willits | 139—128 X |
| 2,272,456 | 2/1942 | Zerbee | 139—127 |
| 3,221,312 | 11/1965 | MacLachlan | 340—174 |

FOREIGN PATENTS

| | | |
|---|---|---|
| 515,151 | 11/1920 | France. |

MERVIN STEIN, *Primary Examiner.*

J. KEECHI, *Assistant Examiner.*